United States Patent
Chae

(10) Patent No.: US 12,209,294 B2
(45) Date of Patent: Jan. 28, 2025

(54) STEEL MATERIAL HAVING LOW YIELD RATIO AND EXCELLENT HEAT AFFECTED ZONE TOUGHNESS AND MANUFACTURING METHOD THEREFOR

(71) Applicant: POSCO, Pohang-si (KR)

(72) Inventor: Jae-Yong Chae, Pohang-si (KR)

(73) Assignee: POSCO CO., LTD, Pohang-si (KR)

( * ) Notice: Subject to any disclaimer, the term of this patent is extended or adjusted under 35 U.S.C. 154(b) by 806 days.

(21) Appl. No.: 17/288,712

(22) PCT Filed: Oct. 25, 2019

(86) PCT No.: PCT/KR2019/014161
§ 371 (c)(1),
(2) Date: Apr. 26, 2021

(87) PCT Pub. No.: WO2020/085848
PCT Pub. Date: Apr. 30, 2020

(65) Prior Publication Data
US 2021/0404031 A1 Dec. 30, 2021

(30) Foreign Application Priority Data
Oct. 26, 2018 (KR) .................. 10-2018-0129081

(51) Int. Cl.
| | | |
|---|---|---|
| *C21D 9/50* | (2006.01) |
| *B23K 9/23* | (2006.01) |
| *C21D 8/02* | (2006.01) |
| *C21D 9/46* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/42* | (2006.01) |
| *C22C 38/44* | (2006.01) |
| *C22C 38/48* | (2006.01) |
| *C22C 38/50* | (2006.01) |
| *C22C 38/54* | (2006.01) |
| *C22C 38/58* | (2006.01) |

(52) U.S. Cl.
CPC ............ *C21D 9/505* (2013.01); *B23K 9/23* (2013.01); *C21D 8/0205* (2013.01); *C21D 8/0226* (2013.01); *C21D 9/46* (2013.01); *C22C 38/001* (2013.01); *C22C 38/002* (2013.01); *C22C 38/02* (2013.01); *C22C 38/04* (2013.01); *C22C 38/06* (2013.01); *C22C 38/42* (2013.01); *C22C 38/44* (2013.01); *C22C 38/48* (2013.01); *C22C 38/50* (2013.01); *C22C 38/54* (2013.01); *C22C 38/58* (2013.01)

(58) Field of Classification Search
CPC .................................................... C21D 9/505
See application file for complete search history.

(56) References Cited

U.S. PATENT DOCUMENTS

| | | | |
|---|---|---|---|
| 2009/0297872 A1 | 12/2009 | Takahashi et al. |
| 2010/0258219 A1 | 10/2010 | Ahn et al. |
| 2017/0002435 A1 | 1/2017 | Jeong et al. |

FOREIGN PATENT DOCUMENTS

| | | |
|---|---|---|
| CN | 105829565 A | 8/2016 |
| CN | 107338392 A | 11/2017 |
| EP | 2434027 A1 | 3/2012 |
| JP | H11-140582 A | 5/1999 |
| JP | 2006-257499 A | 9/2006 |
| JP | 2007-231312 A | 9/2007 |
| JP | 2008-156750 A | 7/2008 |
| JP | 2008-240033 A | 10/2008 |
| JP | 2014-095146 A | 5/2014 |
| JP | 2016-138306 A | 8/2016 |
| KR | 10-2009-0069873 A | 7/2009 |
| KR | 10-2012-0071618 A | 7/2012 |
| KR | 10-2013-0107170 A | 10/2013 |
| KR | 10-2015-0075004 A | 7/2015 |
| KR | 10-2016-0078772 A | 7/2016 |
| WO | 2010/134220 A1 | 11/2010 |
| WO | 2018/088214 A1 | 5/2018 |
| WO | 2018/11759 A1 | 6/2018 |

OTHER PUBLICATIONS

Machine translation of JP2014095146A (Japanese language document published May 22, 2014) (Year: 2014).*
International Search Report dated Feb. 5, 2020 issued in International Patent Application No. PCT/KR2019/014161 (with English translation).
Chinese Office Action dated Dec. 7, 2021 issued in Chinese Patent Application No. 201980070261.1.
Extended European Search Report dated Dec. 9, 2021 issued in European Patent Application No. 19877166.9.
D. Han, "High performance steels: Initiative and practice," Science China Technological Sciences, vol. 55, No. 7, pp. 1774-1790, dated Jul. 2012.
Japanese Office Action dated Jul. 5, 2022 issued in Japanese Patent Application No. 2021-522521.

* cited by examiner

*Primary Examiner* — Christopher S Kessler
(74) *Attorney, Agent, or Firm* — Morgan, Lewis & Bockius LLP

(57) ABSTRACT

The present invention relates to a steel material used as materials for building structures, ship structures, offshore structures, or the like and, more specifically, to a steel material having low yield ratio and excellent weld heat affected zone toughness and a manufacturing method therefor.

6 Claims, 2 Drawing Sheets

[FIG. 1]
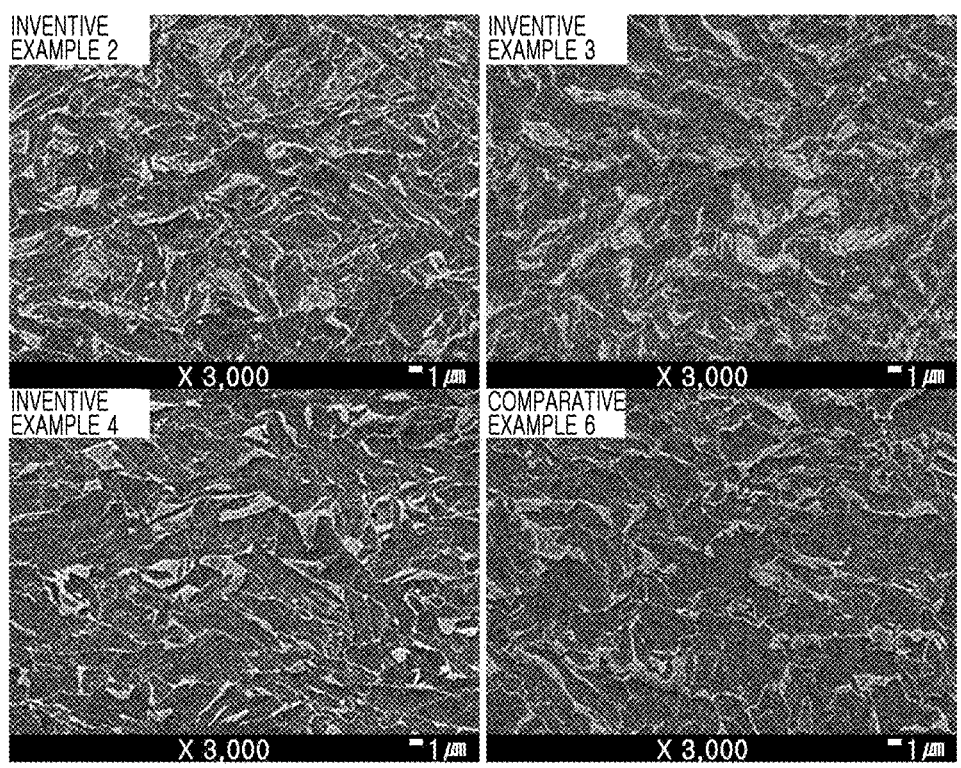

【FIG. 2】
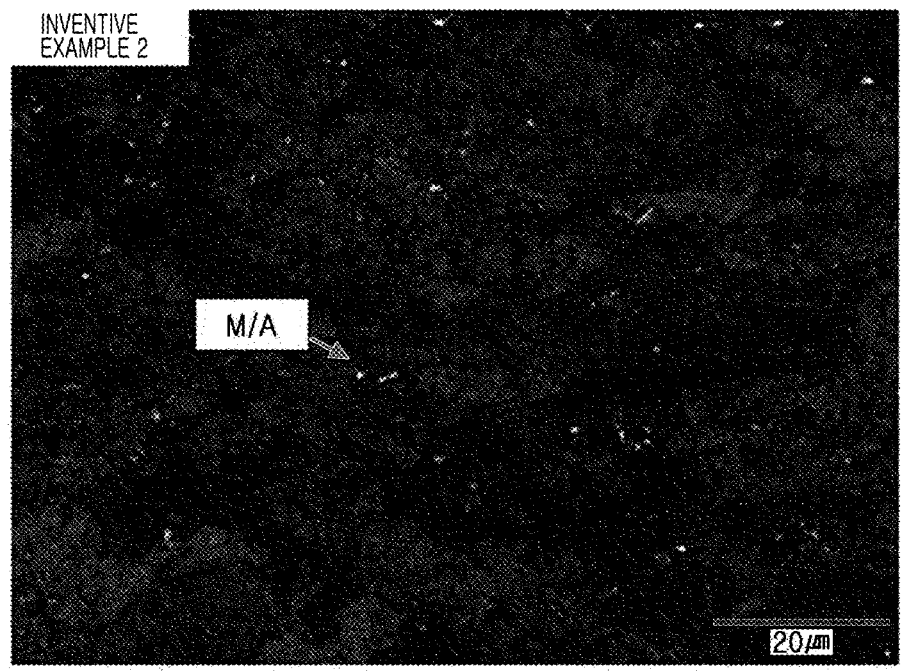
【FIG. 3】
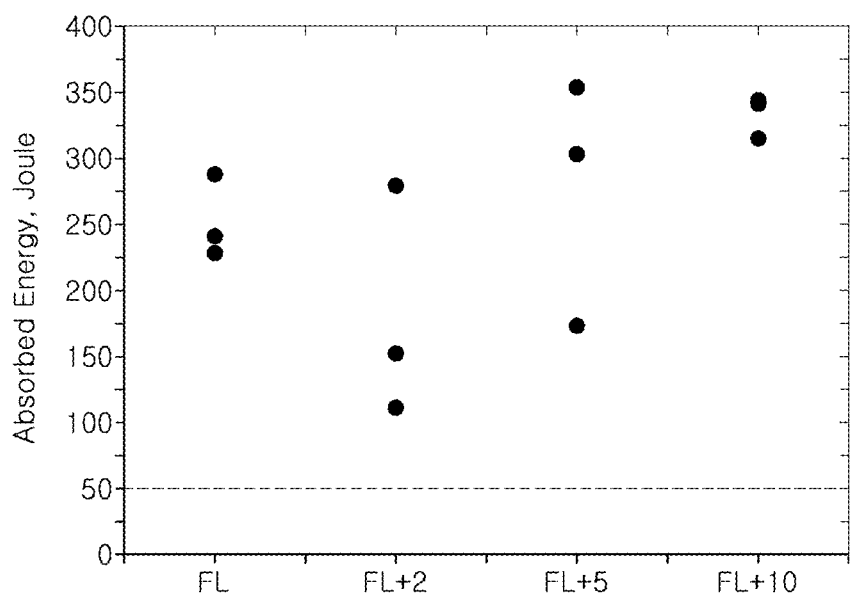

STEEL MATERIAL HAVING LOW YIELD RATIO AND EXCELLENT HEAT AFFECTED ZONE TOUGHNESS AND MANUFACTURING METHOD THEREFOR

CROSS-REFERENCE OF RELATED APPLICATIONS

This application is the U.S. National Phase under 35 U.S.C. § 371 of International Patent Application No. PCT/KR2019/014161, filed on Oct. 25, 2019, which in turn claims the benefit of Korean Application No. 10-2018-0129081, filed on Oct. 26, 2018, the entire disclosures of which applications are incorporated by reference herein.

TECHNICAL FIELD

The present disclosure relates to a steel material used as a material for building structures, ship structures, offshore structures, or the like, and, more particularly, to a steel material having a low yield ratio and excellent welding heat affected zone toughness and a manufacturing method therefor.

BACKGROUND ART

In accordance with the trend for high-rise and large-sized building structures, a steel material used as a material for such structures is also becoming larger, and is being replaced by a thick steel material having a greater thickness, compared to an existing steel material.

In addition to high strength and impact toughness of a base material, the thick steel material may generally require a low yield ratio. In this regard, and the higher the strength and thickness are, the more time and costs required for welding may significantly increase because the thick steel material involves several welding times.

Therefore, when high heat input welding with a high heat input amount is applied, the number of passes of the entire welding may be reduced, to improve welding efficiency, reduce costs thereof, as well as improving stability of a welded structure.

However, as compared to conventional welding, the high heat input welding may have a relatively wide range of a welding heat affected zone (HAZ) of a steel material and a relatively high temperature range of the heat affected zone to grow austenite grains. Therefore, the high heat input welding may form a coarse structure to have a high possibility of deteriorating impact toughness of the heat affected zone.

Meanwhile, in order to solve the above problems, a technique to delay the growth of crystal grains of the welding heat affected zone during welding by properly distributing a Ti-based carbide, a Ti-based nitride, or the like, stable at high temperatures, or the like, has been proposed.

As an example, Patent Document 1 discloses technology using TiN precipitates, and a structural steel material having an impact toughness of about 200 J (a base material may have about 300 J) at 0° C. when a heat input amount of 100 J/cm (maximum heating temperature 1400° C.) is applied. Specifically, a content ratio (Ti/N) of Ti and N is managed at 4 to 12, such that TiN precipitates having a grain size of 0.05 µm or less in a range of $5.8 \times 10^3$ pieces/mm$^2$ to $8.1 \times 10^4$ pieces/mm$^2$, and TiN precipitates having a grain size of 0.03 to 0.2 µm in a range of $3.9 \times 10^3$ pieces/mm$^2$ to $6.2 \times 10^4$ pieces/mm$^2$ are precipitated to make ferrite finer and secure toughness of a weld zone.

However, Patent Document 1 above has a problem that the occurrence of cracks on surfaces of a slab becomes severe during a continuous casting process due to excessive formation of the carbide and nitride. In addition, when producing a thick steel sheet product using such a slab in which a number of cracks on the surfaces are generated, there may be a disadvantage in that a problem such as occurrence of a crack, even on a surface of a final product, or the like, is generated to have issues such as requirements for surface repair, or the like, or such repair itself becomes difficult to have a high possibility of manufacturing a defective product.

Patent Document 2 discloses that a surface crack sensitivity index (Cs) is managed at an appropriate level to suppress the occurrence of surface cracks that may occur, disclosed in Patent Document 1, and elements negatively affecting welding heat affected zone toughness such as Si, Cr, or the like are controlled to obtain a steel material having excellent welding heat affected zone toughness.

However, although the steel material of Patent Document 2 shows improved results compared to the prior art in terms of welding heat affected zone toughness, there is still a tendency that it does not satisfy characteristics of a low yield ratio required for building structures, ship structures, offshore structures, or the like.

This tendency may also occur in the steel material using precipitates such as TiN or the like, as disclosed in Patent Document 1. Since precipitates may be also generated in a base material during a steel making process, yield strength may increase due to a precipitation hardening effect, to be difficult to implement a low yield ratio.

In addition, in general, elements exhibiting an effect of inhibiting grain growth of a welding heat affected zone may also increase yield strength by the effect. Therefore, there is a need for research on a proposal capable of simultaneously realizing toughness of the welding heat affected zone and a low yield ratio of the base material.

(Patent Document 1) Japanese Laid-Open Patent Publication No. 1999-140582

(Patent Document 2) Korean Patent Publication No. 2016-0078772

DISCLOSURE

Technical Problem

An aspect of the present disclosure is to provide a steel material having excellent toughness in a welding heat affected zone as well as a low yield ratio and high toughness of a base material, and a method of manufacturing the same.

The technical problem of the present disclosure is not limited to the aforementioned matters. Additional problems of the present disclosure are described in the overall contents of the disclosure, and those of ordinary skill in the art to which the present disclosure pertains will not have any difficulty in understanding the additional problems of the present disclosure from the contents described in the disclosure of the present disclosure.

Technical Solution

According to an aspect of the present disclosure, a steel material having a low yield ratio and excellent welding heat affected zone toughness, includes, by weight, carbon (C): 0.05 to 0.09%, manganese (Mn): 1.5 to 1.6%, silicon (Si): 0.2 to 0.3%, aluminum (Al): 0.02 to 0.05%, nickel (Ni): 0.4 to 0.5%, phosphorus (P): 0.02% or less, and sulfur (S):

0.01% or less; at least one or more of titanium (Ti): 0.005 to 0.02%, niobium (Nb): 0.01 to 0.05%, copper (Cu): 0.1 to 0.3%, chromium (Cr): 0.1 to 0.2%, and molybdenum (Mo): 0.05 to 0.10%; at least one of boron (B): 5 ppm or less and nitrogen (N): 60 ppm or less; and a balance Fe and other inevitable impurities, and has a thickness of 20 to 100 mm, wherein, when having a thickness of 20 to 40 mm, a microstructure includes, by area fraction, 40 to 50% of low-temperature bainite, 3 to 6% of martensite-austenite (MA), and a remainder of acicular ferrite, when having a thickness of more than 40 mm to 60 mm, a microstructure includes, by area fraction, 35 to 40% of low-temperature bainite, 3 to 5% of martensite-austenite (MA), and a remainder of acicular ferrite, and when having a thickness of more than 60 mm to 100 mm, a microstructure includes, by area fraction, 30 to 35% of low-temperature bainite, 3 to 5% of martensite-austenite (MA), and a remainder of acicular ferrite.

According to an aspect of the present disclosure, a method of manufacturing a steel material having a low yield ratio and excellent welding heat affected zone toughness, includes: reheating a steel slab satisfying the above-described alloy composition at 1100 to 1250° C.; rough-rolling the reheated slab at 900 to 1000° C.; finish hot-rolling the rough-rolled slab at 830 to 870° C. to prepare a hot-rolled steel sheet; cooling the hot-rolled steel sheet to 250 to 500° C. at a cooling rate of 3 to 200° C./s; and air-cooling the cooled steel sheet to room temperature.

Advantageous Effects

According to an aspect of the present disclosure, a steel material having excellent welding heat affected zone toughness during high heat input welding as well as excellent strength and toughness of a base material is provided. Further, the steel material of the present disclosure may have a low yield ratio, and may be thus suitably applied as a structural steel material.

DESCRIPTION OF DRAWINGS

FIG. 1 is a photograph of microstructures of Inventive Examples and Comparative Example according to an aspect of the present disclosure.

FIG. 2 is a photograph of a martensite-austenite (MA) phase of Inventive Example according to an aspect of the present disclosure.

FIG. 3 illustrates measured results of impact toughness (−10° C.), for each position of a weld zone and a welding heat affected zone, after welding, of inventive steel according to an aspect of the present disclosure.

BEST MODE FOR INVENTION

The present inventors have intensively researched to fundamentally solve a problem that a yield ratio of a base material is high when manufacturing a thick steel material for use as a material for existing building structures, and when high heat input welding is applied, toughness of a welding heat affected zone (HAZ) becomes weak. As a result, it has been confirmed that a welding heat affected zone having excellent toughness is secured by optimizing an alloy composition and manufacturing conditions of steel to control not only strength, a yield ratio, and toughness of the base material, but also a structure of the welding heat affected zone formed during welding, and the present disclosure has been then accomplished.

In particular, since the present disclosure may secure excellent toughness of the welding heat affected zone (HAZ) during high heat input welding such as submerged arc welding (SAW), the present disclosure may have an effect of providing a steel material that may be suitably applied as a structural steel material.

Hereinafter, the present disclosure will be described in detail.

A steel material having a low yield ratio and excellent welding heat affected zone toughness, according to an aspect of the present disclosure, may include, by weight, carbon (C): 0.05 to 0.09%, manganese (Mn): 1.5 to 1.6%, silicon (Si): 0.2 to 0.3%, aluminum (Al): 0.02 to 0.05%, nickel (Ni): 0.4 to 0.5%, phosphorus (P): 0.02% or less, and sulfur (S): 0.01% or less; at least one or more of titanium (Ti): 0.005 to 0.02%, niobium (Nb): 0.01 to 0.05%, copper (Cu): 0.1 to 0.3%, chromium (Cr): 0.1 to 0.2%, and molybdenum (Mo): 0.05 to 0.10%; and at least one of boron (B): 5 ppm and less or nitrogen (N): 60 ppm or less.

Hereinafter, the reason why the alloy composition of the steel material provided by the present disclosure is controlled as described above will be described in detail. In this case, unless otherwise specified, an amount of each component means weight %, and a ratio of a structure is based on an area.

Carbon (C): 0.05 to 0.09%

Since carbon (C) may be an element having the greatest influence on securing strength of a steel material, carbon (C) needs to be contained in the steel material in an appropriate amount.

In the present disclosure, when an amount of C is less than 0.05%, strength of the steel material may be excessively reduced, making it difficult to use it as a structural steel material. When an amount of C exceeds 0.09%, a carbon equivalent (Ceq) becomes excessively large. Therefore, hardenability of a base material and a weld zone may be greatly increased, to reduce toughness of the weld zone.

Therefore, in the present disclosure, an amount of C may be 0.05 to 0.09%, and more advantageously, 0.06 to 0.08% may be included.

Manganese (Mn): 1.5 to 1.6%

Manganese (Mn) may be an element useful for securing strength by increasing hardenability of steel. In the present disclosure, it is necessary to appropriately limit an amount thereof in terms of securing toughness of a welding heat affected zone (HAZ).

In general, Mn does not significantly impair the toughness of the welding heat affected zone, but there may be a tendency to segregate in a central portion in thickness of a steel sheet. Since an amount of Mn may be very high compared to an average amount thereof in a region in which Mn is segregated, there may be a problem of easily generating a brittle structure greatly deteriorating welding heat affected zone toughness. In consideration of this, in the present disclosure, Mn may be added in a range of 1.6% or less. When an amount thereof is too low, since there may be a problem that it may be difficult to secure strength of the steel sheet, a lower limit thereof may be limited to 1.5%.

Silicon (Si): 0.2 to 0.3%

Silicon (Si) may be an element necessary for increasing strength of a steel sheet and for deoxidation of molten steel. 0.2% or more of silicon (Si) may be included. Since Si suppresses formation of cementite when unstable austenite is decomposed, thus silicon (Si) may promote a martensite-austenite (MA) structure, which has a problem of greatly deteriorating toughness of a welding heat affected zone. In consideration of the above, 0.3% or less of silicon (Si) may be included. When an amount of Si exceeds 0.3%, coarse Si oxide may be formed, and brittle fracture may occur based on such an inclusion, which is not allowable.

Aluminum (Al): 0.02 to 0.05%

Aluminum (Al) may be an element capable of inexpensively deoxidizing molten steel, and for this purpose, aluminum (Al) may be contained in an amount of 0.02% or more. When an amount thereof exceeds 0.05%, there may be a problem of causing nozzle clogging during a continuous casting process. In addition, since there may be a concern that dissolved Al promotes generation of martensite-austenite in a weld zone, there may be a high possibility that toughness of the weld zone is impaired.

Nickel (Ni): 0.4 to 0.5%

Nickel (Ni) may be an element, advantageous in simultaneously improving strength and toughness of a base material, and for this purpose, Ni may be included in an amount of 0.4% or more. Ni may be an expensive element. When an amount thereof exceeds 0.5%, it may be economically disadvantageous and there may be a concern that weldability may deteriorate.

Phosphorus (P): 0.02% or Less

Phosphorus (P) may be advantageous in improving strength and securing corrosion resistance. Since phosphorus (P) may be an element greatly impairing impact toughness, it is advantageous to contain phosphorus (P) as low as possible. Therefore, phosphorus (P) may have an upper limit of 0.02%. 0% may be excluded in consideration of inevitable addition thereof.

Sulfur (S): 0.01% or Less

Since sulfur (S) may be an element forming MnS or the like to greatly inhibit impact toughness, it is advantageous to contain it as low as possible. Therefore, an upper limit thereof may be set to be 0.01%. 0% may be excluded in consideration of inevitable addition thereof.

In addition to the above-described alloy composition, a steel material having a low yield ratio, according to the present disclosure, may further include at least one or more of titanium (Ti): 0.005 to 0.02%, niobium (Nb): 0.01 to 0.05%, copper (Cu): 0.1 to 0.3%, chromium (Cr): 0.1 to 0.2%, and molybdenum (Mo): 0.05 to 0.10%.

Titanium (Ti): 0.005 to 0.02%

Titanium (Ti) may be combined with nitrogen (N) to form a fine nitride and mitigate coarsening of crystal grains that may occur near a welding fusion line, to suppress a decrease in toughness. In this case, when an amount thereof is too low, the number of Ti nitrides may be insufficient and a coarsening inhibiting effect may be not sufficiently exhibited. Therefore, Ti may be added in a range of 0.005% or more. When an amount of Ti is excessive, since there may be a problem that a grain boundary fixing effect may be deteriorated due to formation of coarse Ti nitride, an upper limit thereof may be limited to 0.02%.

Niobium (Nb): 0.01 to 0.05%

Niobium (Nb) may be an element, effective in increasing strength of steel. Since Nb greatly reduces toughness of a welding heat affected zone, an amount thereof needs to be appropriately limited. In particular, since Nb carbonitride precipitates at an austenite grain boundary during reverse transformation to an austenite region near a welding fusion line to inhibit toughness, Nb may be limited to 0.05% or less, in consideration of the above. In terms of securing strength, Nb may be limited to 0.01% or more.

Copper (Cu): 0.1 to 0.3%

Copper (Cu) may be an advantageous element in improving strength of steel while minimizing a decrease in toughness of a base material. In order to sufficiently obtain such an effect, Cu may be contained in an amount of 0.1% or more. When an amount thereof is excessive, since surface qualities of a product may be greatly impaired, Cu may be contained in an amount of 0.3% or less.

Chromium (Cr): 0.1 to 0.2%

Similarly to Cu, chromium (Cr) may be an element, advantageous in improving strength of steel while minimizing a decrease in toughness of a base material. In order to sufficiently obtain such an effect, Cr may be contained in an amount of 0.1% or more. When an amount thereof exceeds 0.2%, weldability may be greatly reduced, which is not allowable.

Molybdenum (Mo): 0.05 to 0.10%

Molybdenum (Mo) has an effect of suppressing formation of a ferrite phase by greatly improving hardenability of steel with only a small addition amount, and may be advantageous in greatly improving strength. For this, Mo may be contained in an amount of 0.05% or more. When an amount thereof exceeds 0.10%, hardness of a weld zone may greatly increase and toughness may be impaired, which is not allowable.

A steel material having a low yield ratio, according to the present disclosure, may further include at least one of boron (B): 5 ppm or less and nitrogen (N): 60 ppm or less.

Boron (B): 5 ppm or Less

Boron (B) may be an element improving hardenability even with a small addition amount. When an amount thereof exceeds 5 ppm, there may be a problem B may be rather precipitated or crystallized at a grain boundary to greatly inhibiting low-temperature impact toughness. In particular, in the present disclosure, since Mn, Ni, Mo, or the like may be included to secure hardenability, in addition to B, there may be a concern that an excessive amount of B has a negative effect.

Therefore, in the present disclosure, an amount of B may be limited to be 5 ppm or less.

Nitrogen (N): 60 ppm or Less

When nitrogen (N) is added together with titanium (Ti), TiN precipitates may be formed to have an effect of suppressing crystal grain growth due to a welding heat effect. When N is excessively added, since coarse TiN may be formed to impair low-temperature impact toughness, and cracking of a surface may be caused by formation of AlN, N may be limited to be 60 ppm or less in consideration of the above.

The remainder of the present disclosure may be iron (Fe). In the conventional steel manufacturing process, since impurities which are not intended from raw materials or the surrounding environment may be inevitably incorporated, the impurities may not be excluded. All of these impurities are not specifically mentioned in this specification, as they are known to anyone of ordinary skill in the manufacturing process.

The steel material of the present disclosure having the above-described alloy composition may have a thickness of 20 to 100 mm, and may include a low-temperature bainite phase, an acicular ferrite phase, and a martensite-austenite (MA) phase, as a microstructure.

In particular, in the present disclosure, a fraction of the microstructure may be controlled according to a thickness of the steel material.

Specifically, in the steel material, when having a thickness of 20 to 40 mm, a microstructure may include, by area fraction, 40 to 50% of low-temperature bainite, 3 to 6% of martensite-austenite (MA), and a remainder of acicular ferrite, and, when having a thickness of more than 40 mm to 60 mm, a microstructure may include, by area fraction, 35 to 40% of low-temperature bainite, 3 to 5% of martensite-austenite (MA), and a remainder of acicular ferrite. In addition, when having a thickness of more than 60 mm to 100 mm, a microstructure may include, by area fraction, 30 to 35% of low-temperature bainite, 3 to 5% of martensite-austenite (MA), and a remainder of acicular ferrite.

In the present disclosure, as a thickness of the steel material is reduced, a cooling rate may increase during cooling after rolling. Therefore, strength tends to increase by further containing a low-temperature bainite phase. The low-temperature bainite phase may play a major role in securing strength of a base material and a weld zone in the present disclosure. When a fraction thereof is excessive, elongation and impact toughness may be adversely affected. In the present disclosure, a cooling rate and a fraction of a phase of the microstructure need to be closely controlled.

When a fraction of the low-temperature bainite phase among the microstructures of the steel material is insufficient, strength of a target level may not be secured. When a fraction of the acicular ferrite phase or the martensite-austenite phase is insufficient, low-temperature toughness may be rapidly deteriorated.

In addition, when the martensite-austenite phase is included in the above-described fraction, a maximum length of the martensite-austenite phase along a major axis may be 1 μm or less, and there may be distributed as twenty (20) or less in an austenite grain.

When the martensite-austenite phase is uniformly distributed in a fine size in steel, the martensite-austenite phase may contribute to a role of interfering with propagation of a fracture, and thus may playa major role in improving overall mechanical properties such as strength and impact toughness of the steel. Therefore, the martensite-austenite phase may be distributed as uniformly as possible in the steel to improve an effect by the martensite-austenite phase. When a size of the martensite-austenite phase becomes coarse to a certain level or more or distribution thereof is uneven, the martensite-austenite phase may act as a starting point of the fracture or become a path of propagating the fracture, to impair mechanical properties.

In the present disclosure, the martensite-austenite phase is necessary to control a size and distribution thereof. Specifically, an effect by the martensite-austenite phase may be obtained by controlling the same as described above.

A steel material provided by the present disclosure may have the microstructure as described above, to have effects of securing a yield ratio of 85% or less, a tensile strength of 600 MPa or more, and a Charpy impact energy of 100 J or more at −10° C.

Further, a steel material of the present disclosure may be welded, and may a welding heat affected zone (HAZ) having a fraction of martensite-austenite (MA) of 3 to 6%, after welding. A structure except for the martensite-austenite phase may be comprised of low-temperature bainite and acicular ferrite. When a thickness of the steel material exceeds 40 mm, a fraction of martensite-austenite (MA) in the welding heat affected zone (HAZ) formed after welding may be 3 to 5%.

When a fraction of the martensite-austenite in the welding heat affected zone is less than 3%, there may be a concern that strength and toughness may be greatly reduced. When a fraction of the martensite-austenite in the welding heat affected zone exceeds 5% or 6%, or a size or distribution thereof is out of an intended range, there may be a concern that toughness and ductility may be greatly impaired by acting as a fracture starting point or a propagation path. In this case, the distribution of the martensite-austenite in the welding heat affected zone refers to a distribution level of the martensite-austenite in the base material, and refers that the microstructure of the welding heat affected zone is identical or similar to the microstructure phase distribution of the base material controlled by thickness.

A steel material of the present disclosure may have a Charpy impact energy of 100 J or more at −10° C. to have an effect of securing excellent toughness, as the microstructure of the welding heat affected zone is controlled after welding, as described above.

In the present disclosure, as a method of welding the steel material, high heat input welding may be applied, for example, a submerged arc welding (SAW) method with a welding heat input amount of 200 KJ/cm or more may be applied.

For example, even when a steel material of the present disclosure performs the high heat input welding as described above, a welding heat affected zone with minimal deterioration of toughness may be obtained.

Hereinafter, another aspect of the present disclosure will be described in detail with respect to a method of manufacturing a steel material having a low yield ratio and excellent welding heat affected zone toughness.

First, after preparing a steel slab satisfying the above-described alloy composition, the steel slab may be subjected to a process of reheating at 1100 to 1250° C.

When exceeding 1250° C. in the reheating of the steel slab, austenite grains become coarse. Therefore, a steel material having target physical properties may not be obtained. When the temperature is less than 1100° C., re-dissolving of carbonitrides, such as Ti and/or Nb carbonitrides or the like generated in the slab during casting may be difficult.

Therefore, in the present disclosure, the steel slab may be reheated to 1100 to 1250° C.

The reheated steel slab according to the above may be hot-rolled to produce a hot-rolled steel sheet. The hot-rolling may be performed by rough-rolling and finish hot-rolling.

The rough-rolling may be performed in a temperature range of 900 to 1000° C., and the finish hot-rolling may be performed in a temperature range of 830 to 870° C. When a temperature thereof during the rough-rolling is less than 900° C., it may be difficult to secure a target temperature during the subsequent finish hot-rolling, and there may be a concern that quality defects occur. In addition, when a temperature thereof exceeds 870° C. during the finish hot-rolling, a coarse structure may be formed and toughness of steel may be deteriorated. When a temperature thereof is less than 830° C., it may be difficult to control a shape of a plate.

Therefore, rough-rolling and finish hot-rolling may be performed in the above-described temperature range.

The hot-rolled steel sheet manufactured according to the above may be cooled to 250 to 500° C. at a cooling rate of 3 to 200° C./s.

In the present disclosure, the cooling of the manufactured hot-rolled steel sheet may be controlled to form a microstructure, advantageous for securing a low yield ratio.

When a cooling rate thereof is less than 3° C./s, hardenability of a steel sheet may be not sufficiently high. Therefore, a low-temperature bainite structure may not be properly formed, and a pearlite-based microstructure may be generated, to significantly decrease strength and decrease toughness. When a cooling rate thereof exceeds 200° C./s, martensite may be mainly produced, instead of formation of low-temperature ferrite and ferrite phases, to increase excessively high strength, deteriorate toughness, and increase yield ratio. Therefore, properties suitable for use to be applied by the present disclosure may not be secured.

In the present disclosure, different cooling rates may be applied, depending on a thickness of the hot-rolled steel sheet manufactured according to the above. Specifically, the cooling may be performed at 80 to 200° C./s, when a thickness of the hot-rolled steel sheet is 20 to 40 mm; may be performed at 20° C./s or more to less than 80° C./s, when a thickness of the hot-rolled steel sheet is more than 40 mm to 60 mm; or may be performed at 3° C./s or more and less than 20° C./s, when a thickness of the hot-rolled steel sheet is more than 60 mm to 100 mm.

In addition, in cooling at the above-described cooling rate, when an end temperature is less than 250° C., a martensite phase may be excessively formed, strength may be greatly increased, but toughness may be deteriorated. When an end temperature exceeds 500° C., a low-temperature bainite phase may not be properly formed, to be difficult to secure a low yield ratio.

In order to secure the above-described cooling rate, the cooling may be performed by water cooling, and may start cooling at 780 to 860° C. When a temperature at which the cooling starts is too low, a temperature corresponding to two-phase regions of ferrite and austenite may enter before the start of cooling, and there may be a concern that strength of a steel material is greatly reduced, as some ferrite is generated. When the temperature is too high, there may be a concern that heat recuperation occurs in a central portion of a thickness of steel during cooling to generate reverse transformation of a structure, and chances of generating static recrystallization after rolling may be relatively reduced to increase possibility of generating a non-uniform structure.

After completing the above-described cooling process, air-cooling may be performed to room temperature.

A process of performing high heat input welding process on the hot-rolled steel sheet obtained by completing the air cooling may be further performed, and as the high heat input welding process, submerged arc welding (SAW) with a heat input amount of 200 KJ/cm or more may be performed.

A welding heat affected zone (HAZ) formed after the high heat input welding process may have a fraction of martensite-austenite (MA) of 3 to 6%, from which the welding heat affected zone may secure a Charpy impact energy of 100 J or more at −10° C.

In the description below, an example embodiment of the present disclosure will be described in greater detail. It should be noted that the example embodiments are provided to describe the present disclosure in greater detail, and to not limit the scope of rights of the present disclosure. The scope of rights of the present disclosure may be determined on the basis of the subject matters recited in the claims and the matters reasonably inferred from the subject matters.

MODE FOR INVENTION

Example

For steel slabs having alloy compositions illustrated in the following Table 1, hot-rolled steel sheets were prepared by a series of processes (reheating—hot-rolling—cooling) under manufacturing conditions of Table 2 below. In this case, after completing cooling according to Table 2 below, air-cooling was performed to room temperature (RT).

TABLE 1

| | Alloy Composition (wt %) | | | | | | | | | | | | | |
|---|---|---|---|---|---|---|---|---|---|---|---|---|---|---|
| Steel | C | Si | Mn | Al | P | S | Ti | Nb | Cu | Ni | Cr | Mo | B* | N |
| 1 | 0.06 | 0.21 | 1.58 | 0.035 | 0.0040 | 0.0010 | 0.012 | 0.030 | 0.20 | 0.40 | 0.11 | 0.060 | 4 | 0.0052 |
| 2 | 0.07 | 0.25 | 1.57 | 0.035 | 0.0054 | 0.0008 | 0.015 | 0.031 | 0.17 | 0.44 | 0.15 | 0.078 | 1 | 0.0047 |
| 3 | 0.12 | 0.20 | 1.55 | 0.042 | 0.0110 | 0.0025 | 0.011 | 0 | 0.11 | 0.41 | 0 | 0 | 3 | 0.0044 |
| 4 | 0.07 | 0.24 | 1.37 | 0.037 | 0.0087 | 0.0008 | 0.014 | 0.029 | 0.14 | 0.091 | 0.15 | 0.076 | 1 | 0.0043 |
| 5 | 0.04 | 0.21 | 1.55 | 0.041 | 0.0099 | 0.0054 | 0.017 | 0.040 | 0.25 | 0.42 | 0.56 | 0.230 | 15 | 0.0051 |
| 6 | 0.17 | 0.28 | 1.41 | 0.035 | 0.0110 | 0.0010 | 0.016 | 0.014 | 0.17 | 0.40 | 0 | 0 | 2 | 0.0048 |

(In Table 1, B* is expressed in ppm)

TABLE 2

| Steel | Thickness (mm) | Reheating Extracting Temp. (° C.) | Rough Rolling Temp. (° C.) | Finish Rolling Temp. (° C.) | Cooling Rate (° C./s) | Cooling End Temp. (° C.) |
|---|---|---|---|---|---|---|
| 1 | 20 | 1130 | 961 | 869 | 120 | 489 |
| 1 | 40 | 1130 | 929 | 855 | 90 | 493 |
| 1 | 40 | 1130 | 966 | 869 | 80 | 583 |
| 1 | 60 | 1128 | 906 | 844 | 65 | 405 |
| 1 | 80 | 1128 | 903 | 835 | 5 | 367 |
| 2 | 20 | 1129 | 962 | 849 | 120 | 492 |
| 2 | 40 | 1130 | 930 | 838 | 90 | 489 |
| 2 | 80 | 1127 | 904 | 844 | 42 | RT (30) |
| 2 | 100 | 1204 | 980 | 866 | 4 | 480 |
| 2 | 133 | 1140 | 955 | 857 | 2 | 450 |
| 3 | 80 | 1137 | 905 | 855 | 4 | 395 |
| 4 | 40 | 1142 | 918 | 860 | 80 | 428 |
| 5 | 20 | 1170 | 990 | 869 | 140 | 366 |
| 6 | 80 | 1157 | 921 | 868 | 4 | 401 |

Mechanical properties (yield strength (YS), tensile strength (TS), elongation (El), yield ratio (YR)), and impact toughness (CVN, −10° C.) of each of the prepared hot-rolled steel sheets were measured, and results therefrom were illustrated in Table 3 below. In this case, tensile test specimens were taken at a point of ¼ t in a thickness direction (where, t means a thickness of each of the steel sheets (mm)), in a direction, perpendicular to a rolling direction (a transverse direction) according to the JIS No. 5 standard, and each of the taken specimens was subjected to a tensile test at room temperature. In addition, impact toughness test specimens were taken at a point of ¼t in a thickness direction, in a direction, perpendicular to a rolling direction (a transverse direction) according to the ASTM E23 standard, and a Charpy V-notch impact test was performed 3 times at each measurement temperature to be determined as an average value.

For a fraction of a microstructure, a specimen for structure observation was taken from remnants of the impact toughness test specimens, and then a fraction (area %) of low-temperature bainite and acicular ferrite was firstly measured by SEM according to the method specified in the ASTM E560 standard, and, after erosion of Lepera, a fraction of martensite-austenite was secondly measured using an optical microscope, and results therefrom were illustrated in Table 3 below.

ness 60 mm), Inventive Example 4 (thickness 80 mm), and Comparative Example 6 (thickness 20 mm), observed with an scanning electron microscope (SEM). In addition, FIG. 2 is a photograph of a martensite-austenite phase of Inventive Example 2 (thickness 40 mm).

As shown in FIGS. 1 and 2, it can be seen that, in the Inventive Examples, low-temperature bainite and acicular ferrite phases were sufficiently formed, and martensite-austenite phases were formed in several portions. In the Comparative Example, low-temperature bainite and acicular ferrite phases were not sufficiently formed, and a resulting bainite phase was also presumed to be formed at a high temperature due to its shape. Due to the differences in microstructure, it may be judged that the Comparative Example exhibited lower strength than the Inventive Examples.

Submerged arc welding (SAW) was performed on some of the hot-rolled steel sheets prepared above at a heat input amount of 226 KJ/cm.

Specimens were taken from a fusion line (FL) in a welding heat affected zone formed by completing the welding, and impact toughness (CVN (−10° C., −20° C., and −40° C.)) thereof was measured. In addition, specimens were also taken at FL+2, FL+5 and FL+10 sites to measure impact toughness (CVN), and results therefrom were illustrated in Table 4 below (where, +2, +5, and +10 sites refer

TABLE 3

| Steel | Thickness | YS (MPa) | TS (MPa) | YR | El (%) | CVN (@−10° C., J) | Microstructure (B/AF/MA, fraction %) | Example |
|---|---|---|---|---|---|---|---|---|
| 1 | 20 | 495 | 616 | 80 | 20 | 338 | 50/44/6 | IE1 |
| 1 | 40 | 531 | 627 | 85 | 22 | 352 | 44/52/4 | IE2 |
| 1 | 40 | 436 | 559 | 78 | 24 | 312 | 24/76/0 | CE1 |
| 1 | 60 | 476 | 606 | 78 | 30 | 348 | 35/60/5 | IE3 |
| 1 | 80 | 510 | 612 | 83 | 31 | 388 | 32/64/4 | IE4 |
| 2 | 20 | 585 | 690 | 84 | 18 | 364 | 50/45/5 | IE5 |
| 2 | 40 | 522 | 626 | 83 | 24 | 360 | 40/56/4 | IE6 |
| 2 | 80 | 655 | 728 | 90 | 13 | 80 | 75/15/10 | CE2 |
| 2 | 100 | 506 | 603 | 84 | 22 | 357 | 30/67/3 | IE7 |
| 2 | 133 | 420 | 511 | 82 | 17 | 98 | 15/85/0 | CE3 |
| 3 | 80 | 570 | 648 | 88 | 11 | 170 | 28/70/2 | CE4 |
| 4 | 40 | 612 | 688 | 89 | 12 | 46 | 39/60/1 | CE5 |
| 5 | 20 | 460 | 518 | 89 | 29 | 302 | 34/65/1 | CE6 |
| 6 | 80 | 622 | 687 | 91 | 9 | 62 | 55/45/0 | CE7 |

IE: Inventive Example,
CE: Comparative Example (In Table 3, B denotes a low-temperature bainite phase, AF denotes an acicular ferrite phase, and MA denotes a martensite-austenite phase)

As illustrated in Tables 1 to 3, it can be seen that Inventive Examples 1 to 7 satisfying the alloy composition and the manufacturing conditions, proposed in the present disclosure, have the intended microstructure to have excellent impact toughness with a low yield ratio as well as excellent strength and ductility. It can be seen that this effect is secured regardless of thicknesses of the steel sheets.

In Comparative Examples 4 to 7 not satisfying the alloy composition proposed by the present disclosure, it was difficult to secure a low yield ratio in common, and, impact toughness was deteriorated in Comparative Examples 5 and 7 thereamong.

In Comparative Examples 1 to 3 satisfying the alloy composition proposed by the present disclosure, but not satisfying the manufacturing conditions proposed by the present disclosure, strength or toughness was deteriorated.

FIG. 1 is a photograph of microstructures of Inventive Example 2 (thickness 40 mm), Inventive Example 3 (thickto a point 2 mm, 5 mm, and 10 mm, apart from the fusion line, in a direction of the base material, respectively). In this case, the impact toughness was measured as an average value by conducting a Charpy V-Notch impact test 3 times at each temperature (−10° C., −20° C., and −40° C.)

TABLE 4

| | Temp. | Position of Welding HAZ | | | |
|---|---|---|---|---|---|
| Example | (° C.) | FL | FL + 2 mm | FL + 5 mm | FL + 10 mm |
| IE4 | −10 | 252 | 180 | 276 | 333 |
| IE4 | −20 | 194 | 240 | 233 | 309 |
| IE4 | −40 | 91 | 237 | 136 | 152 |
| CE5 | −10 | 77 | 52 | 89 | 91 |
| CE5 | −20 | 29 | 18 | 41 | 44 |
| CE7 | −10 | 42 | 31 | 88 | 102 |
| CE7 | −20 | 27 | 24 | 91 | 105 |
| CE7 | −40 | 13 | 27 | 66 | 90 |

IE: Inventive Example, CE: Comparative Example

As illustrated in Table 4, it can be seen that impact toughness of a fusion line (FL) in a welding heat affected zone obtained by welding hot-rolled steel sheets (Inventive Examples) manufactured according to the alloy composition and the manufacturing conditions, proposed in the present disclosure, by a SAW process was excellent (see FIG. 3).

In Comparative Example 7 having the same thickness as Inventive Example 4, it can be seen that impact toughness of a fusion line in a welding heat affected zone after welding was deteriorated. In addition, even in Comparative Example 5 having a relatively thin thickness, it can be seen that impact toughness was very poor over an entire section of the welding heat affected zone.

While example embodiments have been shown and described above, it will be apparent to those skilled in the art that modifications and variations could be made without departing from the scope of the present disclosure as defined by the appended claims.

The invention claimed is:

1. A steel material having a low yield ratio and excellent welding heat affected zone toughness,
   comprising, by weight, carbon (C): 0.05 to 0.09%, manganese (Mn): 1.5 to 1.6%, silicon (Si): 0.2 to 0.30, aluminum (Al): 0.02 to 0.05%, nickel (Ni): 0.4 to 0.5%, phosphorus (P): 0.02% or less, and sulfur(S): 0.01% or less;
   at least one or more of titanium (Ti): 0.005 to 0.02%, niobium (Nb): 0.01 to 0.05%, copper (Cu): 0.1 to 0.3%, chromium (Cr): 0.1 to 0.2%, and molybdenum (Mo): 0.05 to 0.10%;
   at least one of boron (B): 5 ppm or less and nitrogen (N): 60 ppm or less; with a balance Fe and other inevitable impurities, and
   having a thickness of 20 to 100 mm,
   wherein,
   when having a thickness of 20 to 40 mm, a microstructure includes, by area fraction, 40 to 50% of low temperature bainite, 3 to 6% of martensite-austenite (MA), and a remainder of acicular ferrite,
   when having a thickness of more than 40 mm to 60 mm, a microstructure includes, by area fraction, 35 to 40% of low-temperature bainite, 3 to 5% of martensite-austenite (MA), and a remainder of acicular ferrite, and
   when having a thickness of more than 60 mm to 100 mm, a microstructure includes, by area fraction, 30 to 35% of low-temperature bainite, 3 to 5% of martensite-austenite (MA), and a remainder of acicular ferrite,
   wherein the martensite-austenite has a maximum length of 1 mm or less along a major axis, and the steel material includes twenty (20) or less of an austenite grain.

2. The steel material of claim 1, having a tensile strength of 600 MPa or more, a yield ratio of 85% or less, and a Charpy impact energy of 100 J or more at −10° C.

3. The steel material of claim 1, having a welding heat affected zone (HAZ) having a fraction of martensite-austenite (MA) of 3 to 6%, after welding.

4. The steel material of claim 3, wherein the welding heat affected zone (HAZ) has a Charpy impact energy of 100 J or more at −10° C.

5. The steel material of claim 1, wherein the steel material includes titanium (Ti): 0.005 to 0.02%, niobium (Nb): 0.01 to 0.05%, copper (Cu): 0.1 to 0.3%, chromium (Cr): 0.1 to 0.2%, and molybdenum (Mo): 0.05 to 0.10%.

6. Steel material of claim 1, wherein the steel material includes boron (B): 1 ppm or more and 5 ppm or less, and nitrogen (N): 43 ppm or more and 60 ppm or less; with a balance Fe and other inevitable impurities.

* * * * *